United States Patent [19]

Urich et al.

[11] Patent Number: 5,009,062
[45] Date of Patent: Apr. 23, 1991

[54] BALING APPARATUS

[75] Inventors: Oren D. Urich, Windsor; Vernie G. Meyer, Fort Collins, both of Colo.

[73] Assignee: Colorado National Manufacturers, Inc., Windsor, Colo.

[21] Appl. No.: 307,846

[22] Filed: Feb. 7, 1989

[51] Int. Cl.⁵ ............................................. A01D 39/00
[52] U.S. Cl. ............................ 56/341; 100/19 R; 100/24; 100/43; 100/100; 100/145; 100/148; 100/904
[58] Field of Search ................. 100/145–150, 100/100, 242, 3, 4, 8, 15, 17, 11, 19 R, 24, 65, 18, 43; 56/341–343, 14.7

[56] References Cited

U.S. PATENT DOCUMENTS

| 689,399 | 12/1901 | Jones . | |
|---|---|---|---|
| 713,791 | 11/1902 | Orman . | |
| 1,045,184 | 11/1912 | Randleman . | |
| 2,030,031 | 2/1936 | Innes . | |
| 2,080,316 | 5/1937 | Innes | 100/145 X |
| 2,179,937 | 11/1939 | Lamp | 100/145 X |
| 2,571,489 | 10/1951 | Russell . | |
| 2,696,777 | 12/1954 | Sutch | 100/148 X |
| 3,044,391 | 7/1962 | Pellett | 100/148 |
| 3,063,361 | 11/1962 | Gehrke . | |
| 3,222,853 | 12/1965 | Michael . | |
| 3,230,902 | 1/1966 | Grimm et al. . | |
| 3,683,796 | 8/1972 | Miner et al. . | |
| 4,186,658 | 2/1980 | Brown | 100/145 X |
| 4,565,123 | 1/1986 | Sanders | 100/43 |
| 4,655,128 | 4/1987 | St. Clair . | |

FOREIGN PATENT DOCUMENTS

| 0009850 | 4/1980 | European Pat. Off. | 100/148 |
|---|---|---|---|
| 8401063 | 11/1985 | Netherlands | 100/145 |

Primary Examiner—Harvey C. Hornsby
Assistant Examiner—Stephen F. Gerrity
Attorney, Agent, or Firm—Dean P. Edmundson

[57] ABSTRACT

Apparatus is described for forming fibrous bulk material or the like into a baled unit and binding it. The apparatus includes: (a) a rotatable auger, (b) a tubular housing surrounding the auger, (c) feeding mechanism for feeding bulk material to the housing, (d) a die adjacent the tubular housing, (e) a packing chamber adjacent the die, and (f) binding or tying mechanism to bind the baled unit without cessation of rotation of the auger.

18 Claims, 14 Drawing Sheets

FIG. I

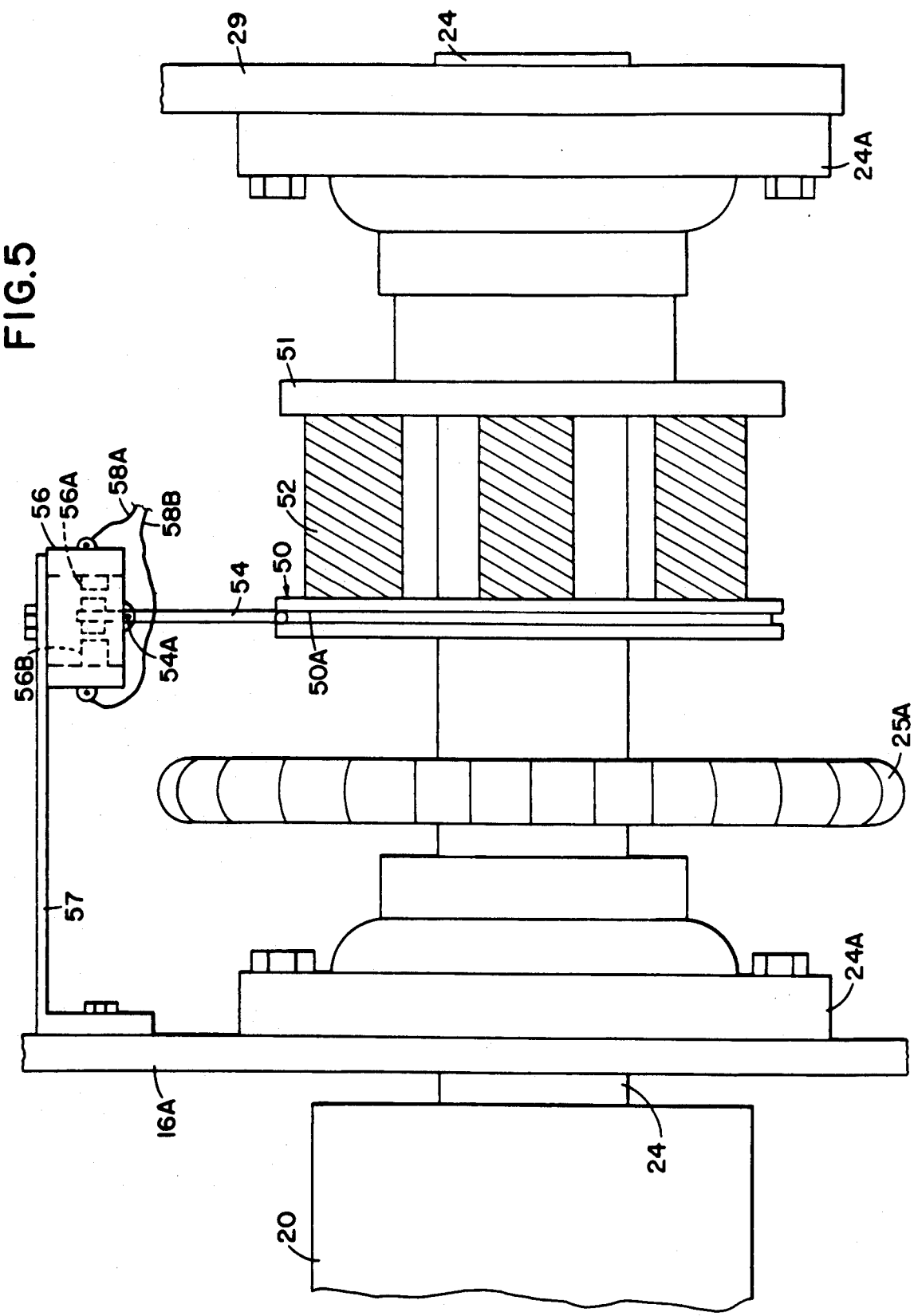

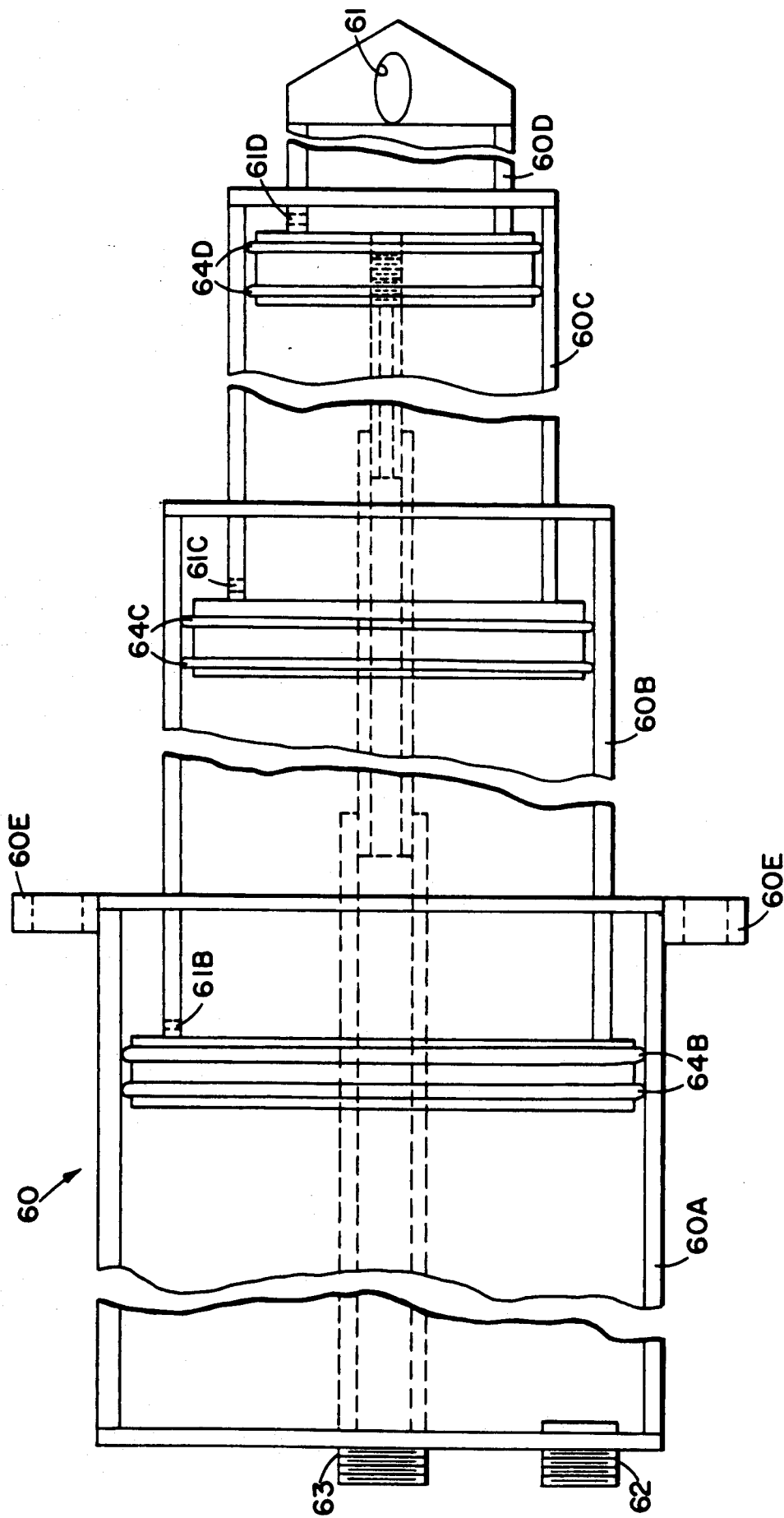

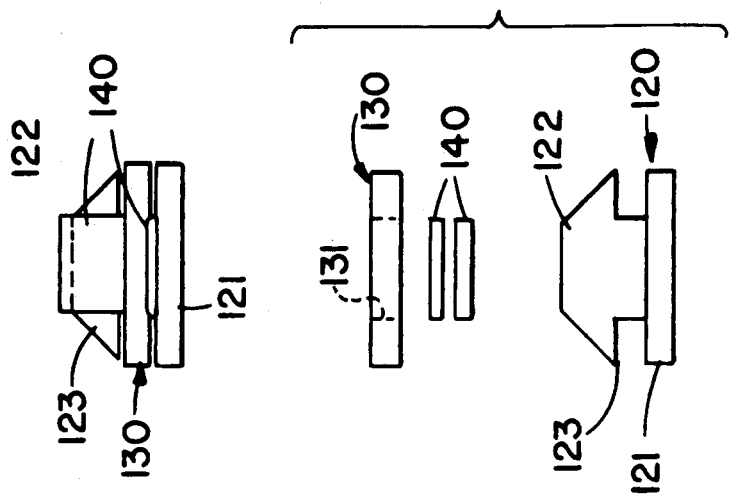
FIG.IID  FIG.IIB
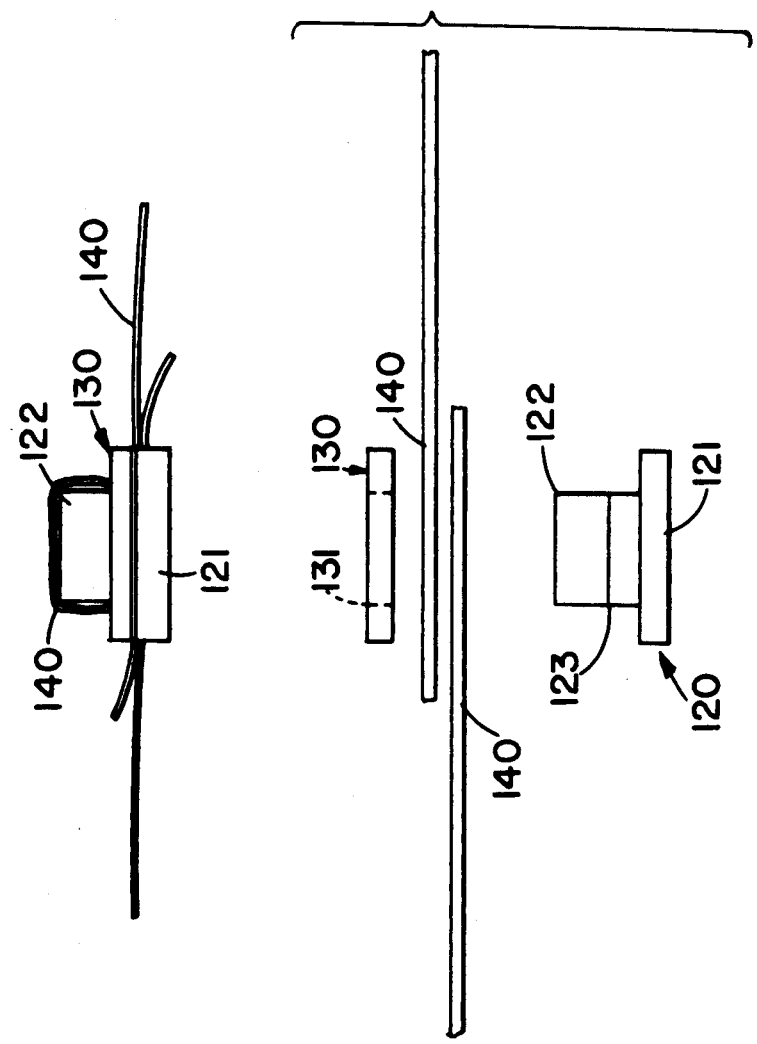
FIG.IIC  FIG.IIA

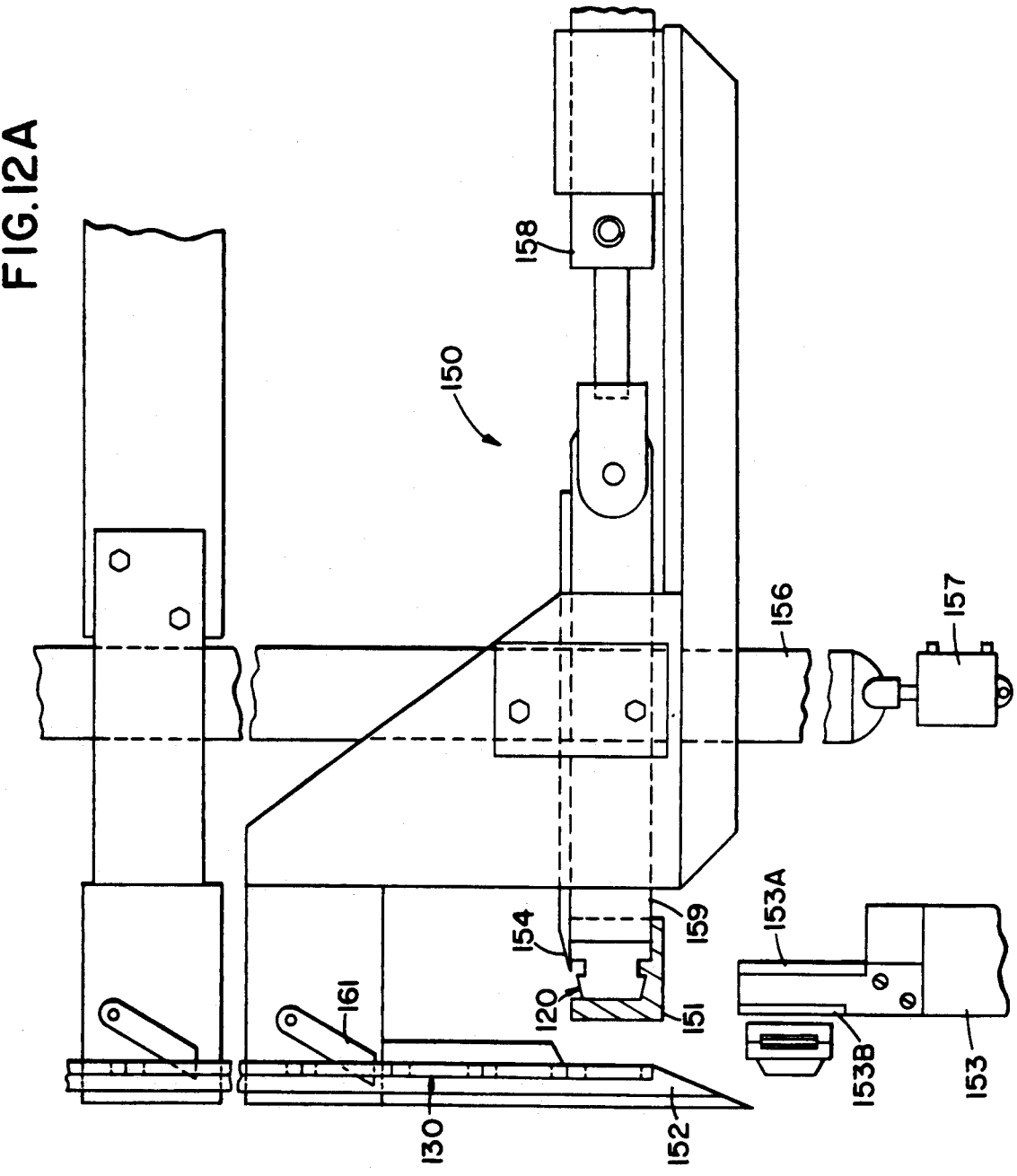

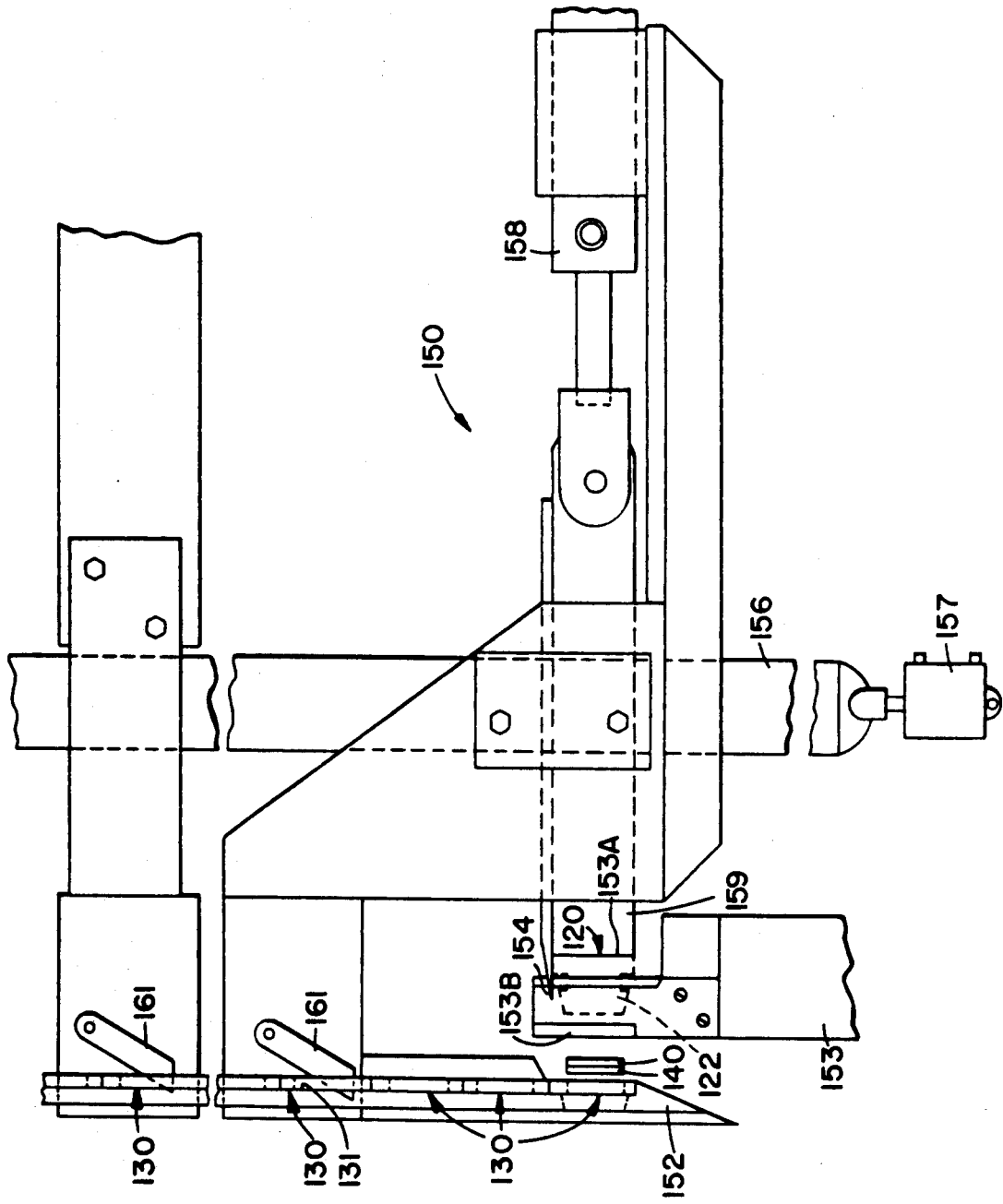

BALING APPARATUS

FIELD OF THE INVENTION

This invention relates to apparatus for forming bulk fibrous material or the like into a baled unit. More particularly, this invention relates to apparatus which can be towed or driven through a field for picking up and baling bulk material into large bound bales.

BACKGROUND OF THE INVENTION

For many years it has been fairly conventional practice to mechanically compress various types of bulk material (particularly fibrous material) into bales which are bound by wire, twine, or other suitable binding material. The equipment used for this purpose may be generally referred to as baling equipment or apparatus.

This type of equipment has been commonly used on farms and ranches for baling hay, straw, and other fibrous materials. It has also been used in various industrial or commercial applications.

Baling machines have been previously provided for gathering and compressing material into bales of various sizes and shapes. For example, baling machines have commonly been used for making round bales, square bales, rectangular bales, etc.

More recently baling machines have been designed for making relatively large bales (e.g., 4 feet square by 8 feet long, or 4 feet in diameter and 4 or 5 feet long). These large bales provide certain advantages. For example, it is more efficient to handle a few large bales as compared to handling numerous small bales.

There are some disadvantages, however, associated with the use of previously known baling machines. For example, many conventional agricultural baling machines utilize a large plunger to pack the material to form a compressed bale. This requires a significant amount of power, and the resulting packing of the bulk material is not uniform. Conventional round baling machines do not utilize plungers but instead they cause the bulk material to be rolled upon itself very tightly. Another disadvantage of such equipment is that the packing and compressing of the material must be interrupted in order to perform the binding or tying operation.

When many types of bulk materials are compacted too tightly, spoilage of the material often results because of trapped moisture in the material. Air cannot penetrate into tightly packed material. Furthermore, tightly packed material is not easily separated or loosened when the bale is opened. This can detract from palatability and also interferes with the desired uniform nature of the material.

Prior art baling apparatus and equipment are described, for example, in U.S. Pat. Nos. 689,399; 713,791; 1,045,184; 2,030,031; and 2,571,489. Devices for bagging material are described in U.S. Pat. Nos. 3,222,853 and 4,655,128. Pelletizing apparatus is described in U.S. Pat. Nos. 3,063,361 and 3,230,902 describes apparatus for making compressed blocks of food material in a tube. U.S. Pat. No. 3,683,796 describes apparatus for compacting comminuted waste material.

There are a number of disadvantages associated with conventional plunger-type balers. The cost of construction of such balers is relatively high due to the large number of individual components required. Also, because of the large number of high wear components used in such machines, there are reliability problems and a need for a significant amount of maintenance to keep the machine working properly.

Another problem associated with conventional plunger-type balers is that there is an unreliable and non-uniform distribution of bulk material in the resulting bale. Further, the power requirement for operation of the conventional plunger-type baler is greater than required in the apparatus of the present invention.

Although conventional apparatus is available for making very large baled units of bulk material (in either round or square cross-section), such apparatus does not provide any means for effecting ventilation of the baled unit. As a result, spoilage can easily result in large baled units made by conventional apparatus.

There has not heretofore been described baling apparatus for uniformly and efficiently gathering, compressing, and binding various types of bulk materials.

SUMMARY OF THE PRESENT INVENTION

In accordance with the present invention there is provided apparatus for forming fibrous bulk material or the like into a baled unit and binding it, the apparatus including a wheeled frame and comprising:

(a) rotatable auger means having first and second ends;

(b) a tubular housing surrounding the auger means; wherein the housing has first and second ends; wherein the second end is open;

(c) feed means adapted to feed the bulk material to the auger means;

(d) die means having first and second ends, wherein the first end communicates with the second end of the housing;

(e) a packing or receiving chamber communicating with the second end of the die means;

(f) binding means.

The auger means is adapted to urge the bulk material through the housing and the die means and into the packing chamber. The die means shapes the bulk material to form the shape of the baled unit and control the density. The binding means is adapted to encircle a quantity of the shaped bulk material with a flexible binding member and then secure the binding member so as to form the baled unit without cessation of rotation of the auger means. Several binding members may be used, if desired.

The apparatus of this invention is very efficient, thus enabling smaller tractors to be used in powering the apparatus than is required to power previously known apparatus of the same size and capacity.

Also, the apparatus of this invention compresses the bulk material uniformly throughout the baled unit. Furthermore, the apparatus provides a central longitudinal opening through the baled unit for allowing air to pass through. This helps to prevent spoilage of bulk material containing moisture.

Another advantage of the apparatus of this invention is that it is adaptable to any desired cross-sectional configurations for the baled unit (e.g., square, rectangular, round, etc.).

Still another advantage of the apparatus of this invention is that the baled unit can be tied or bound without stopping the auger rotation or stopping the feed of bulk material into the auger. This feature has not heretofore been available.

BRIEF DESCRIPTION OF THE DRAWINGS

The invention is described in more detail hereinafter with reference to the accompanying drawings, wherein like reference characters refer to the same parts throughout the several views and in which:

FIG. 5 is a side elevational view illustrating the control system for controlling packing density in the baled unit;

FIG. 6 is a side cut-away view of one of the needles which is useful in the apparatus of the invention;

FIGS. 11A and 11B are exploded side and end views, respectively, illustrating how the two ends of flexible strapping material are oriented with respect to the mating clamp sections;

FIGS. 11C and 11D are side and end views, respectively, showing how the two overlapping ends of the strapping material are secured together with the mating clamp sections; and FIGS. 12A and 12B are side elevational views illustrating two positions for one embodiment of clamping device useful in the apparatus of this invention.

DETAILED DESCRIPTION OF THE INVENTION

Figure 1:
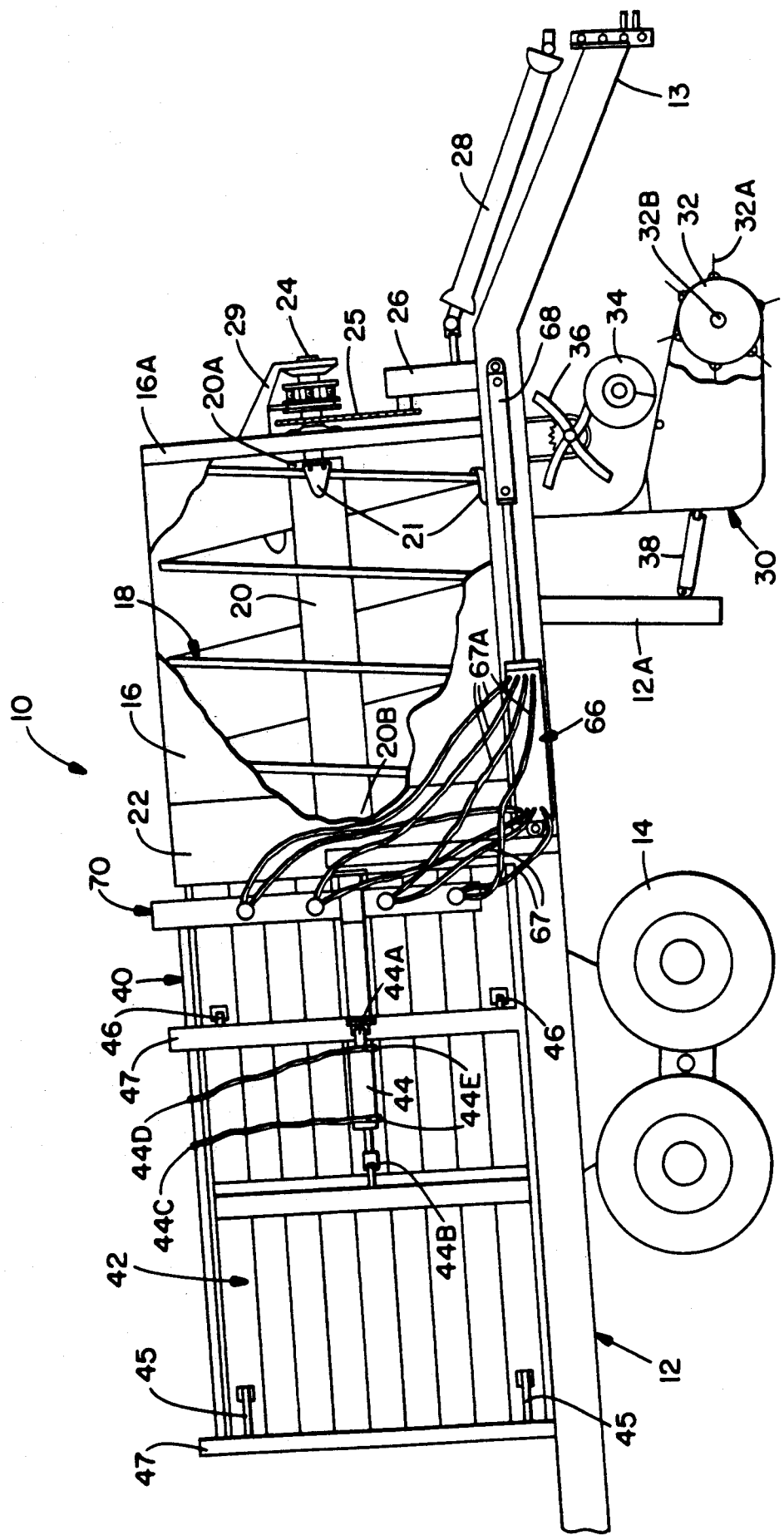
FIG. 1 is a side elevational view (partially cutaway) showing one embodiment of baling apparatus of the invention.

Thus, in the drawings there is illustrated one embodiment of baling apparatus 10 for baling fibrous bulk material such as hay, straw, cornstalks, and the like, as well as cardboard, paper, rags, cotton, scrap materials, etc. The apparatus comprises an elongated frame 12 which is supported on its underside by means of wheels 14. The leading end of the frame includes a hitch or tongue member 13 to facilitate towing of the apparatus during use (e.g., by a farm tractor).

Supported on the front portion of the frame is an elongated tubular housing 16 in which there is disposed a rotatable auger member 18 having central shaft 20. Immediately rearwardly of the housing 16 and auger 18 is a tubular die member 22 which is open at its forward and rearward ends. The rearward end 20B of shaft 20 extends through the length of the die member but the auger fliting does not extend past the rearward end of housing 16.

The forward end 20A of auger shaft 20 is connected to drive shaft 24 powered by power take-off shaft 28 which is connected to the tractor at one end and is connected to gear box 26 at its opposite end. Chain 25 transfers power from the gear box to shaft 24.

The die member 22 provides some resistance to the flow of the bulk material through the apparatus. The cross-sectional area of the exit end (i.e., the rearward end) of the die member is the same as or less than the cross-sectional area of the rearward end of the tubular housing 16. The cross-sectional configuration of the rearward end of the die member may differ from the cross-sectional configuration of the forward end of the die member. For example, the forward end may be circular in cross-section and the rearward end may be square or rectangular in cross-section.

As another example, the forward and rearward ends are both square in cross-section, but the rearward end is smaller than the forward end. In one embodiment, the diameter at the forward end is 56 inches and the diameter at the rearward or exit end is 46 inches.

Pick-up means or hopper 30 at the forward end of the apparatus includes a rotating cylinder 32 supported on shaft 32B transversely of the apparatus. A plurality of fingers 32A assist in lifting up the hay, straw, etc. from the ground (e.g., from a windrow) as the apparatus is towed across a field.

The fingers lift the bulk material and push it rearwardly toward auger member 34 which is oriented transversely to the direction of travel of the apparatus. The auger pushes the bulk material toward the center of the pick-up head 30. Lift wheel 36 is driven in a manner such that it lifts the gathered bulk material and pushes it upwardly through an opening in the forward end of frame 12 and tubular housing 16.

The pick-up header 30 may be raised or lowered hydraulically by means of hydraulic cylinder 38 secured between the pick-up header and downwardly extending leg 12A of frame 12.

As the bulk material is pushed through the opening and into the forward end of the tubular housing 16, auger member 18 (which includes spiral fliting) urges the bulk material rearwardly through housing 16 and also distributes and compresses the bulk material in a uniform manner in the die. Knives 21 may be included on the periphery of the auger fliting at the forward end of the auger in order to cut long stemmed bulk material entering the housing to prevent it from becoming wedged in the opening. Such knives are not needed when the bulk material has a short fiber length.

Figure 2:
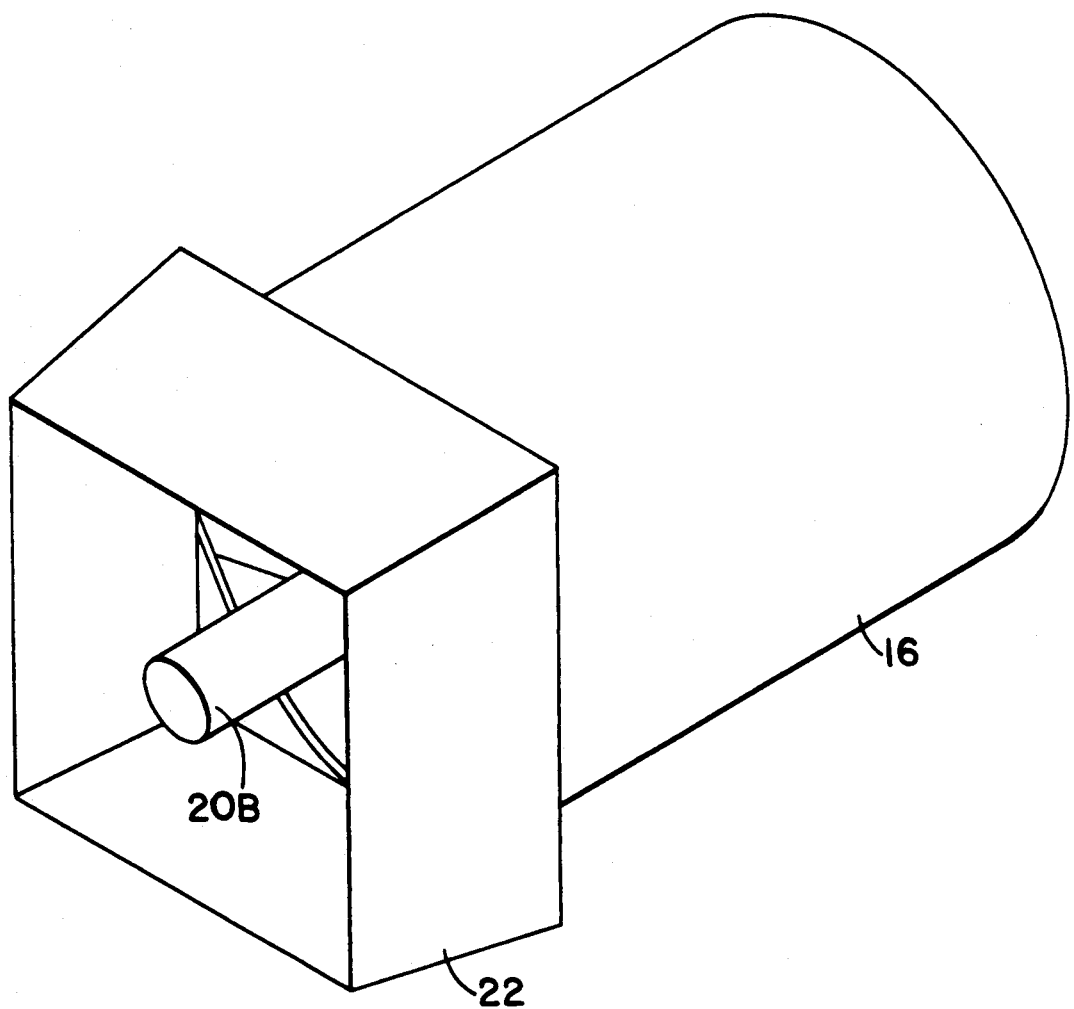
FIG. 2 is a perspective view illustrating the die member and the rearward portion of the tubular auger housing.

As the bulk material leaves the rearward end of the housing 16 it enters the die area 22 where the cross-sectional shape of a bale is determined. For example, when the eventual baled unit is to have a square cross-sectional configuration, the die 22 has a square cross-section at its rearward or exit end. The leading end of the die 22 may be circular in cross-section to match the cross-section at the rearward end of housing 16 or it may also be square in cross-section. This is illustrated in FIG. 2.

The length and diameter of the die member may vary. For example, it may be a few inches in length (e.g., about 12 inches) or it may be a few feet long (e.g., about 5 feet). When making large baled units the length of the die is preferably about 36 to 48 inches. The diameter and cross-sectional configuration of the die member may vary as described above.

The diameter of the auger member may also vary (e.g., from about 12 inches to about 60 inches). For most applications a diameter of about 24 to 48 inches is preferred.

Figure 9:
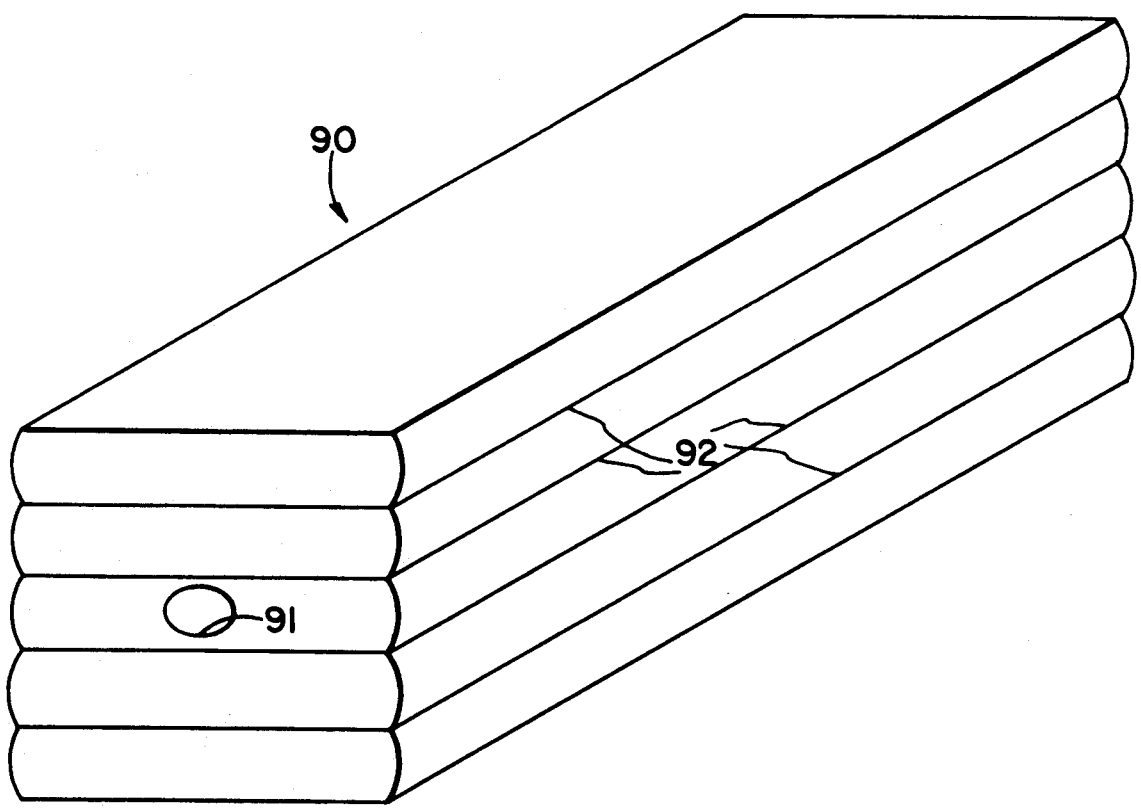
FIG. 9 is a perspective view illustrating one form of baled unit produced by the apparatus of the invention.

The rearward end 20B of the auger shaft 20 extends through the central portion of the die. As a result, the bulk material becomes formed around the shaft. This leaves a very desirable longitudinal opening through the central portion of the resulting baled unit through the entire length thereof. This opening facilitates drying of moisture present in the bulk material by allowing air to pass through it. This is illustrated in FIG. 9 where baled unit 90 includes longitudinal central opening 91. Binding elements 92 secure the baled unit.

The diameter of the rearward end 20B of shaft 20 may vary, as desired, in order to provide any desired diameter for the central opening through the resulting baled unit.

Although the diameter of the rearward end 20B of shaft 20 may vary, typically it has a diameter in the range of about 10 to 20% (more preferably about 15%) of the diameter of the rearward end of the tubular housing. The larger the rearward end 20B of shaft 20, the larger the longitudinal opening through the baled unit.

After the bulk material leaves the rearward end of the die member 22 it enters a packing chamber 40. When the packing or receiving chamber is square or rectangular in cross-section it is defined by the planar floor on frame 12, a top member 41, and two opposing side members 42. The length of the packing chamber may vary. Preferably it is several feet long. It is open at both ends.

Packing density in the baled bulk material is adjustable by means of the packing chamber 40. By reducing the cross-sectional area of the packing chamber, additional force is required in order to push the bulk material through it. This increases the packing density in the bulk material.

Figure 3:
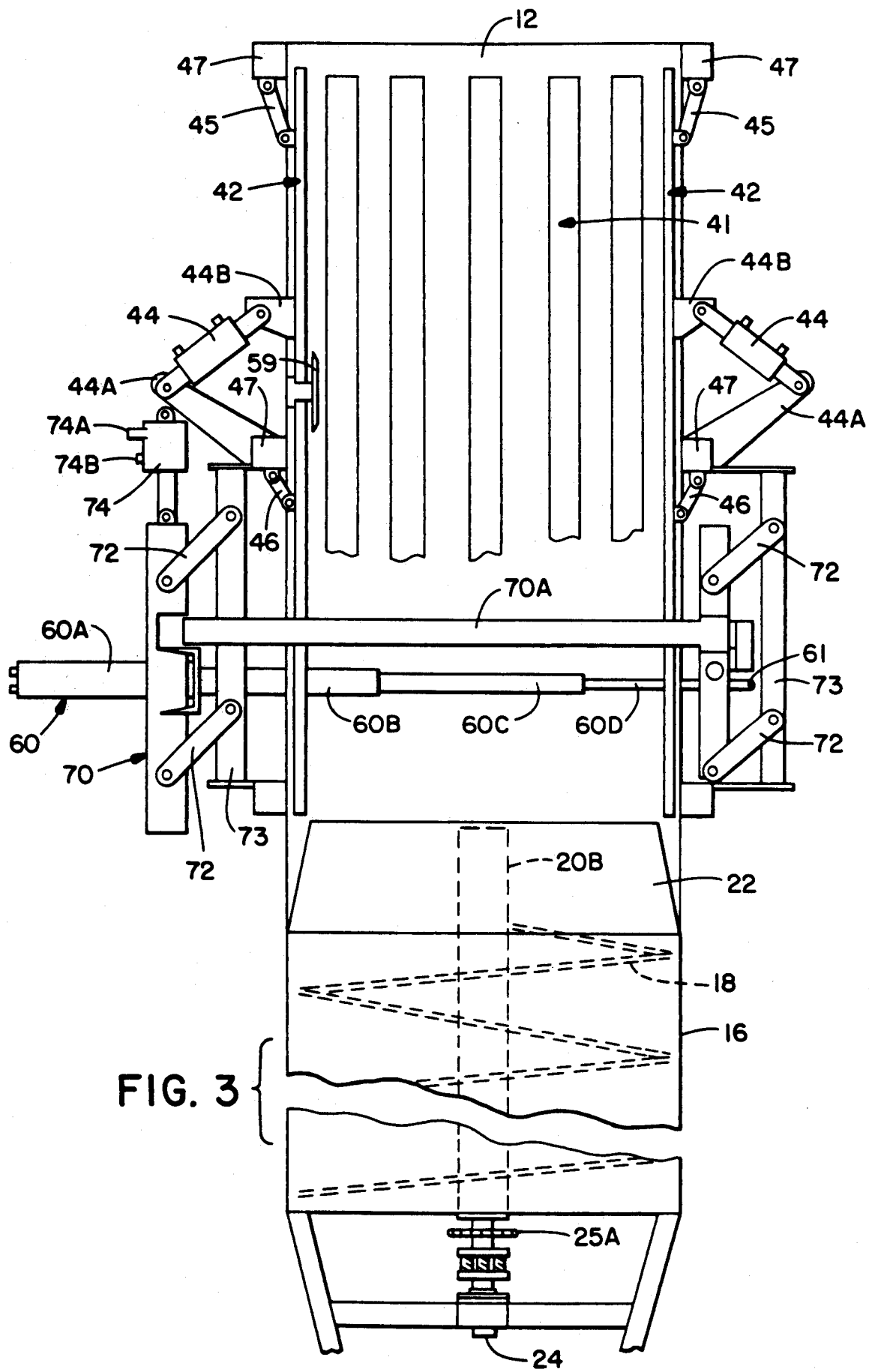
FIG. 3 is a top view of the apparatus of FIG. 1.
Figure 4:
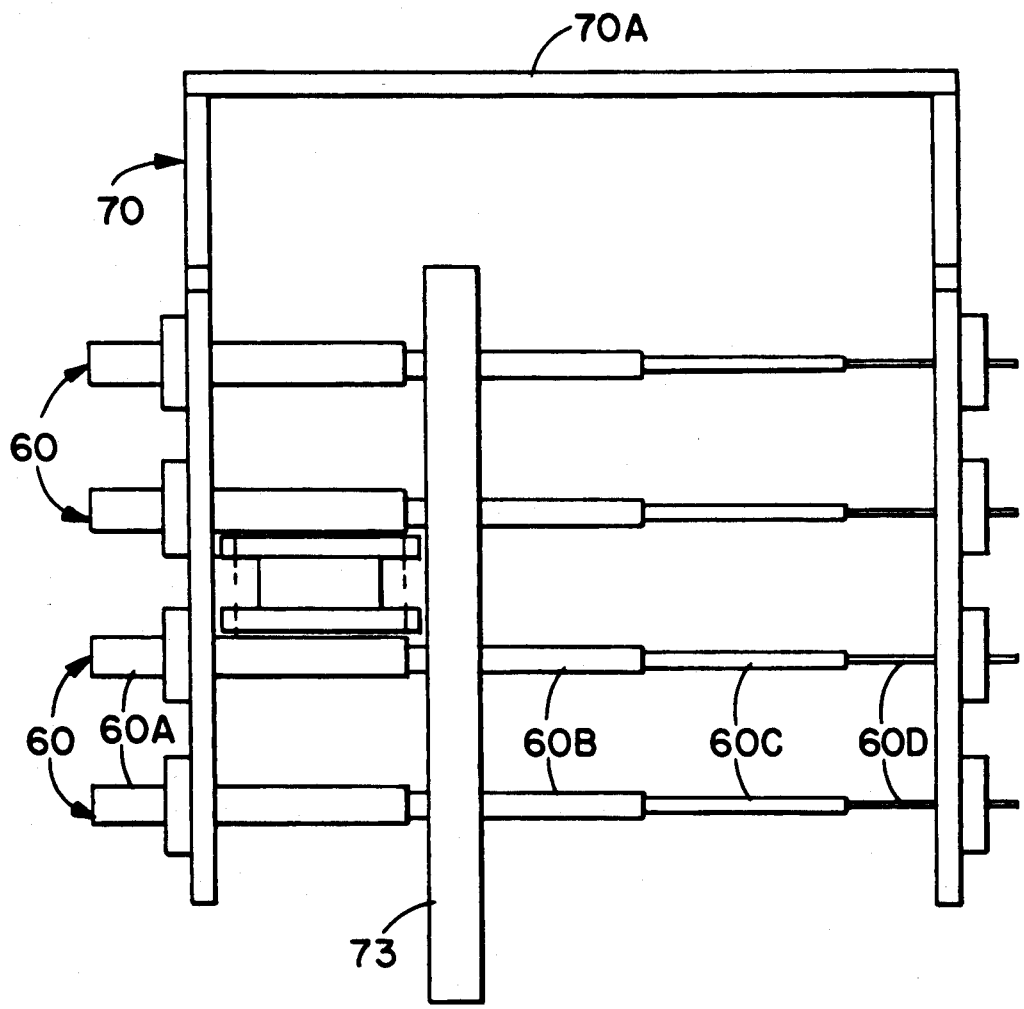
FIG. 4 is an end view illustrating the needles in their extended position.

As illustrated in FIG. 3, one or both side members 42 of the packing chamber may be mounted in a manner such that one or both can be urged inwardly to reduce the cross-sectional area of the chamber. For example, each side member can be carried on links 45 and 46 hinged to the upright framework. Hydraulic cylinders 44 control movement of the side panels inwardly and outwardly, as needed.

Each cylinder 44 is mounted at one end to an anchor or support 44A carried by the frame 12. The other end of each cylinder 44 is mounted to a bracket 44B secured to the central portion of a side member 42. The two cylinders 44 are connected together with hoses 44C and 44D in a manner such that the two cylinders operate in the same manner (i.e., the cylinders retract and extend outwardly in unison). Thus, the two side members move inwardly or outwardly in the same manner, as desired, to increase packing density or decrease it.

The forward end of each side member is carried on shorter links (46) than are used for the rearward end (45). In this manner the rearward portion of the side member is moved inwardly to a greater extent than the forward portion, as illustrated. Each link member is pivotably mounted at each end (i.e., one end is connected to an upright support 46 carried by the frame 12 and one end is connected to a mounting bracket carried by the side member 42).

Alternatively, either the top or bottom members, or both, of the packing chamber may be movable so as to reduce the cross-sectional area of the packing chamber and thereby increase the packing density of the bulk material forced into it by the auger 18.

The cross-sectional area of the packing or receiving chamber may be varied several percent (e.g., 10–15%) by movement of the side members or the top member in order to increase or decrease packing density.

The packing density of the bulk material can be controlled automatically by means of sensing means operatively connected to drive shaft 24. The sensing means includes two pressure plates and a plurality of springs extending between them. As the packing density of the bulk material reaches a certain level, one pressure plate is adapted to move a lever which activates a microswitch.

One embodiment of sensing means is illustrated in FIGS. 1 and 5. As the packing density of the bulk material increases, the auger 18 is urged axially forward a small distance (i.e., toward the front wall 16A of housing 16).

Shaft 24 is similarly moved in a forward direction a small distance (e.g., 0.2–0.5 inch). Shaft 24 extends through the forward wall 16A of housing 16 and is supported by bearings 24A. One of the bearings is supported by the front wall of the housing and the other is supported by bracket 29. Sprocket 25A is secured to shaft 24 forwardly of wall 16A. Chain 25 engages the sprocket 25A.

Plate 50 is attached to shaft 24 and plate 51 is attached to bearing 24A. The plates are separated by springs 52. Plate 50 includes a groove or channel 50A which extends around the periphery of plate 50.

One end of a lever 54 extends into the groove 50A. The opposite end of lever 54 extends into a switch box 56 supported by bracket 57.

Lever 54 is pivoted between its ends by a pin 54A. The switch box 56 includes switches 56A and 56B on opposite sides. When lever 54 pivots about pin 54A in one direction it activates either switch 56A or 56B, depending upon the direction of movement of lever 54. When the lever 54 is moved in the opposite direction it activates the other of such switches. Wire 58A is operably connected to switch 56A and wire 58B is operably connected to switch 56B.

When the packing density increases, the auger shaft 20 and shaft 24 are urged slightly in a forward direction. As a result, plate 50 is moved slightly forward toward plate 51 against the tension of springs 52. This causes lever 54 to pivot about pin 54A and engage switch 56B. Wires 58A and 58B lead to an electric over hydraulic valve which is adapted to cause cylinders 44 to extend or retract. The valve is located between a source of hydraulic pressure and lines 44E connected to one of cylinders 44.

Thus, when lever 54 activates switch 56B as the packing density of the bulk material reaches a high level, the valve is activated to cause cylinders 44 to retract. This in turn pulls side members 42 outwardly to relieve pressure on the compressed bulk material is the packing chamber.

When lever 54 activates switch 56A (when the packing density drops below a certain level), the valve is activated to cause cylinders 44 to extend. This causes the side members 42 to be moved towards each other to increase packing density.

In operation, the auger shaft 20 continually moves forwardly and rearwardly a slight distance and alternately activates switches 56A and 56B. This causes the cylinders 44 to continually retract and extend to adjust the packing density of the bulk material on a continuous basis during the baling operation. The result is a uniformly packed baled unit. The position of the switch box 56 may be adjusted (either forwardly or rearwardly) to determine the actual packing density required in the baled unit.

The bulk material packed in the packing or receiving chamber is tied or bound with a plurality of flexible strings or other such binding members which extend completely around the compressed bulk material. The binding members are held at one of their ends by clamps on one side of the packing chamber and then extend around the rearward end of the bulk material to be bound and extend to the extensible needles on the opposite side of the packing chamber. When it is desired to complete the baled unit, the needles are caused to be extended through the bulk material in the forward portion of the packing chamber. When the needles reach the far side of the packing chamber the knotting mechanism grasps the binding members, severs them, and then ties the two ends of each binding member together to complete the baled unit. Other types of tying or binding mechanisms can also be used.

The auger member 18 continues to rotate through the entire binding operation. In other words, there is no need to stop the forward motion of the baling apparatus, or the operation of the pick-up means 30, or the operation of the auger. The bulk material continues to be pushed through housing 16 and die 22 into the forward end of the packing chamber.

The needles 60 are secured to and carried by carriage means 70 which is movably mounted on the packing chamber, as illustrated, by means of link members 72 pivotally connected between the carriage member 70 on each side of the packing chamber and support members 73. Cross-member 70A extends from one side of the packing chamber to the other.

A wheel 59 is rotatably mounted on the top of the packing chamber. As the packed bulk material is urged rearwardly through the packing chamber, the wheel 59 engages the material and rotates. As it rotates, wheel 59 measures the length of the packed material. When a predetermined length is reached, the wheel activates an electric switch to thereby actuate an electric over hydraulic valve. The valve enables hydraulic fluid to force the needles 60 to be extended from one side of the packing chamber to the opposite side through the bulk material.

As the needles are extended through the bulk material during the binding operation, the carriage means 70 moves rearwardly in accordance with the speed at which additional bulk material enters the front of the packing chamber. In other words, the carriage member 70 is moved rearwardly by reason of the rearward movement of the packed bulk material pushing against the extended needles 60. After the binding operation is completed the needles are retracted out of the packing chamber. Then the carriage means is returned to its original starting position by means of air cylinder 74 until the next binding operation begins. Pressurized air enters the cylinder through inlet port 74A and is vented through port 74B.

The needles 60 each preferably comprise a plurality of telescoping sections, as illustrated in FIGS. 3, 4, 6, 7A and 7B. The needles may be operated hydraulically, pneumatically, or mechanically.

Each needle assembly 60 preferably includes telescoping sections 60A, 60B, 60C and 60D. Base section 60A is adapted to be secured to carriage member 70 by means of bolts placed through mounting brackets 60E. Sections 60B, 60C, and 60D are adapted to be urged outwardly when pressurized hydraulic fluid enters the base section through inlet port 62. When the base section fills with fluid, the fluid is forced past O-rings 64B and can enter the section 60B through port 61B. When the fluid is forced past O-rings 64C it can enter the section 60C through port 61C. When the fluid is forced past O-rings 64D it can enter section 60D through port 61D. In this manner the sections are forced outwardly to pass from one side of the packing chamber to the opposite side. The outer end of section 60D is slightly pointed and includes opening or eye 61 for carrying the flexible binding material across the packing chamber through the bulk material.

To cause the cylinder sections to retract the hydraulic fluid is forced through port 63. The fluid then passes through the interior tubes shown in FIG. 6. It then forces the sections to move in a manner such that they are retracted into base section 60A.

The several extensible needles 60 operate in unison. They are each coupled by hoses 67 and 67A to a source of pressurized hydraulic fluid exemplified by master cylinder 66 which in turn is operated by cylinder 68. When it is determined that the packed bulk material in the packing chamber has reached the proper length e.g., by means of wheel 59 shown in FIG. 3), the associated electrical switch causes a hydraulic valve to open to enable pressurized hydraulic fluid to enter cylinder 68. This then causes hydraulic fluid in cylinder 66 to force needles 60 to become extended by reason of hydraulic fluid passing through hoses 67. In order to cause the needles to become retracted, cylinder 68 is retracted (which causes hydraulic fluid to flow through hoses 67A).

Figure 7B:
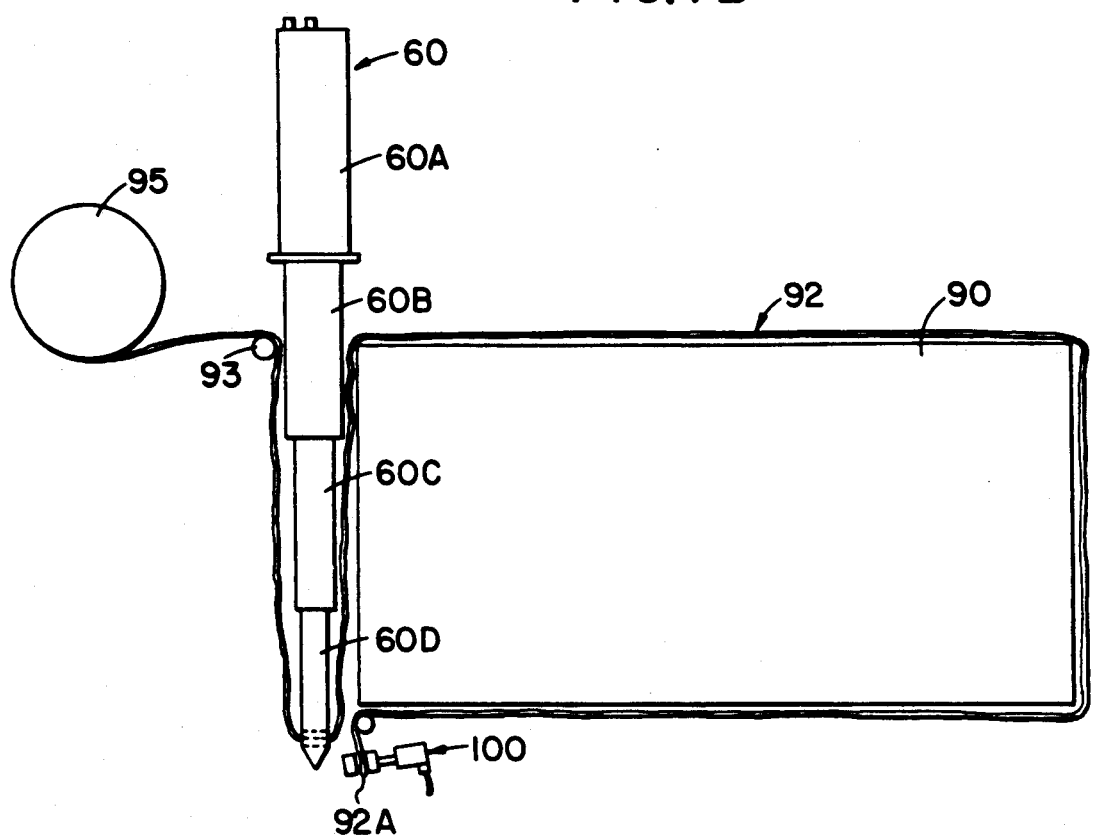
FIGS. 7A and 7B illustrate extended and retracted positions of one of the needles during the baling operation.
Figure 7A:
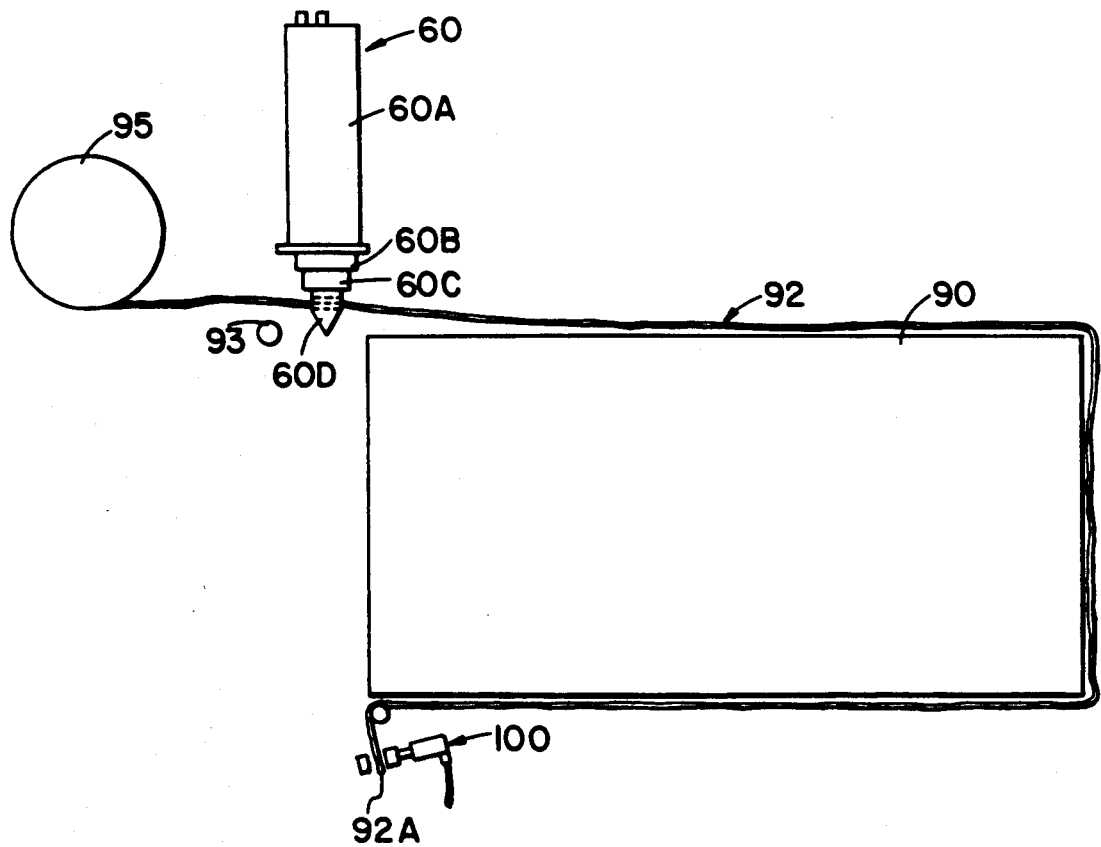

FIGS. 7A and 7B illustrate the manner of operation of each needle 60. In FIG. 7A the needle is in retracted position. Flexible binding member 92 (e.g., nylon or other plastic string, twine, strapping material, etc.) is supplied by roll 95 and extends through opening 61 in the outer end of section 60D. Then it passes around the rear portion of the packed bulk material 90 and extends along the opposite side thereof to a conventional knotter mechanism 100 where the end 92A is clamped and held firmly.

When the electrical switch is activated by the gauge wheel 59 (or by any other suitable means), and the hydraulic fluid is caused to enter base section 60A of each needle assembly so as to cause each needle to become extended, the pointed end of section 60D is caused to pierce through the packed bulk material as illustrated in FIG. 7B. As the needle extends it carries along the binding member 92, as illustrated. The binding material passes around idler pulley 93 as it is drawn off roll 95 when the needles extend. When the needle reaches the opposite side of the packing chamber, the conventional knotter clamps it to the end 92A, severs the binding material, and then ties the two ends of the binding material together to form a knot. The knotter also clamps the free end of the binding material and holds it. Then the needles immediately retract into base 60A. As soon as the needles are retracted, a switch is activated to cause pressurized air to enter cylinder 74 which then causes carriage 70 to move to its forward position again. As additional bulk material is forced into the packing chamber it pushes against the binding material 92 and begins the formation of a new bale.

While the needles are forced through the bulk material from one side of the packing chamber to the other the auger continues to force additional bulk material through the die 22 and into the front of the packing chamber. Because the needles are carried on a floating carriage, there is no need to stop the auger operation while the binding material is tied around a bale unit. This is a very distinct and unique advantage over conventional balers.

After a baled unit has been tied or secured it is forced rearwardly out of the packing chamber by the advancing bulk material forming the next baled unit. Eventually the first baled unit reaches the rearward end of the packing chamber and drops to the ground or is forced onto a trailer towed behind the baling apparatus.

Figure 10A:
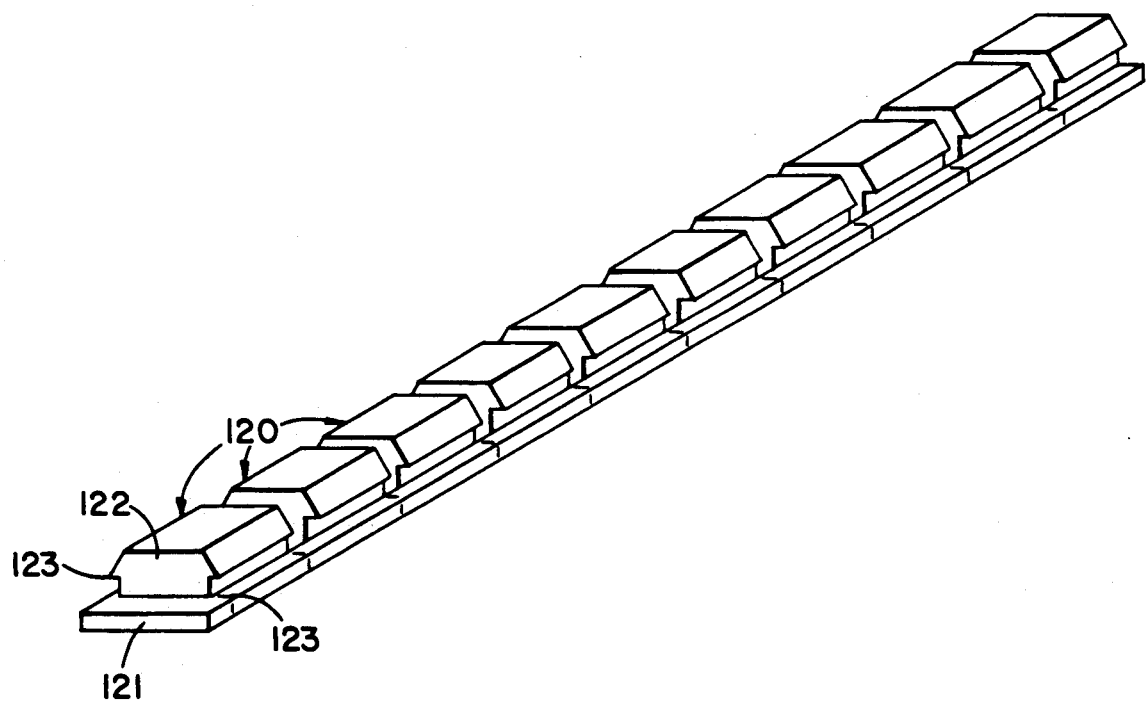
FIGS. 10A and 10B are perspective views illustrating continuous strip forms of mating clamp members which may be used in binding strapping material around a baled unit.
Figure 10B:
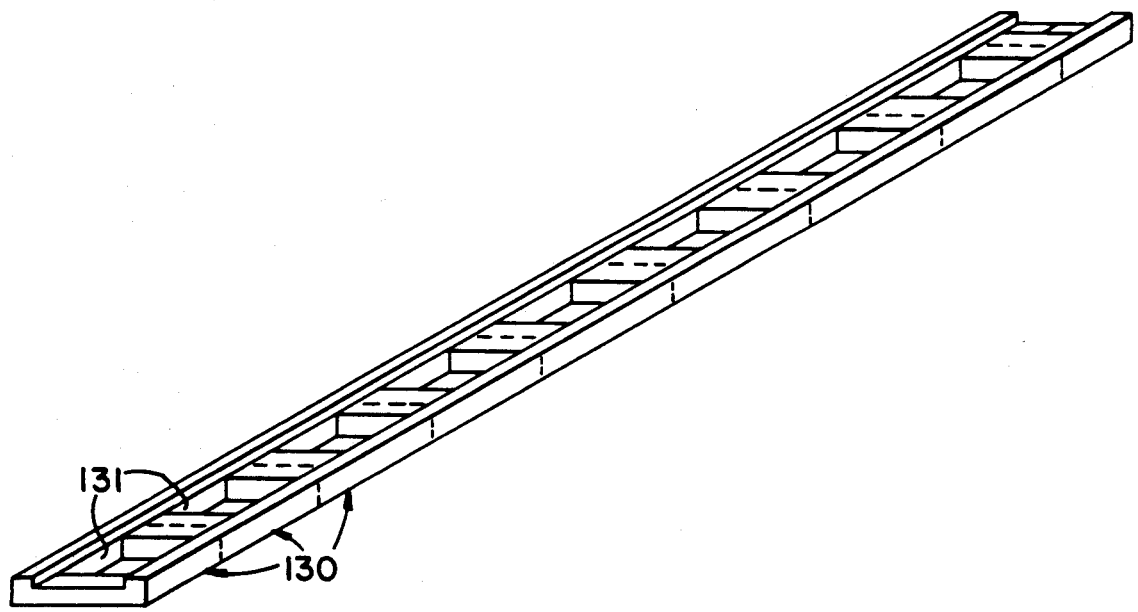

FIGS. 10A and 10B illustrate mating fastener portions 120 and 130, respectively, which can be produced in continuous strip form. These fastener portions 120 and 130 cooperate to form a very durable and effective clamp for securing two ends of a flexible strap together. Individual fastener portions can be easily severed from each strip.

Each fastener portion 120 comprises a base 121 and an upstanding ridge member 122 having an outwardly projecting wing 123 on opposite sides thereof. Preferably the wings 123 taper as they extend outwardly. The underside of each wind 123 is preferably planar and parallel to the top of the base 121.

Each fastener portion 130 includes a central opening 131 therethrough which is only slightly larger than the top surface of ridge 122 of fastener portion 120. The length of opening 131 is shorter than the width of ridge 122 and wings 123. The width of opening 131 is approximately the same as the length of ridge 122.

When the top surface of ridge 122 is square, then the opening 131 should also be square. When the top surface of ridge 122 is rectangular, then the opening 131 should also be rectangular. In other words, the opening 131 should be capable of fitting onto ridge 122 and then be frictionally retained on ridge 122 by means of wings 123.

The operation of the clamp or fastener is illustrated in FIGS. 11A, B, C and D. FIG. 11A is an exploded side viewing showing two ends of flexible strapping material 140 between fastener portions 120 and 130. FIG. 11B is an end view.

FIG. 11C illustrates the assembly after fastener portion 130 has been pushed onto ridge portion 122 to capture the two straps 140 therebetween. FIG. 11D is an end view of the completed assembly.

The ring member 130 is captured at opposite sides by the projecting wings 123 of ridge 122. The ring member is made of resilient plastic which enables it to be forced over the wings 123 of ridge 122. The strap material 140 is oriented so as to pass over ridge 122 in a manner such that the material 140 does not extend over the wings 123. Rather, the material 140 is oriented parallel to the edges of the wings 123, as illustrated.

Figure 8:
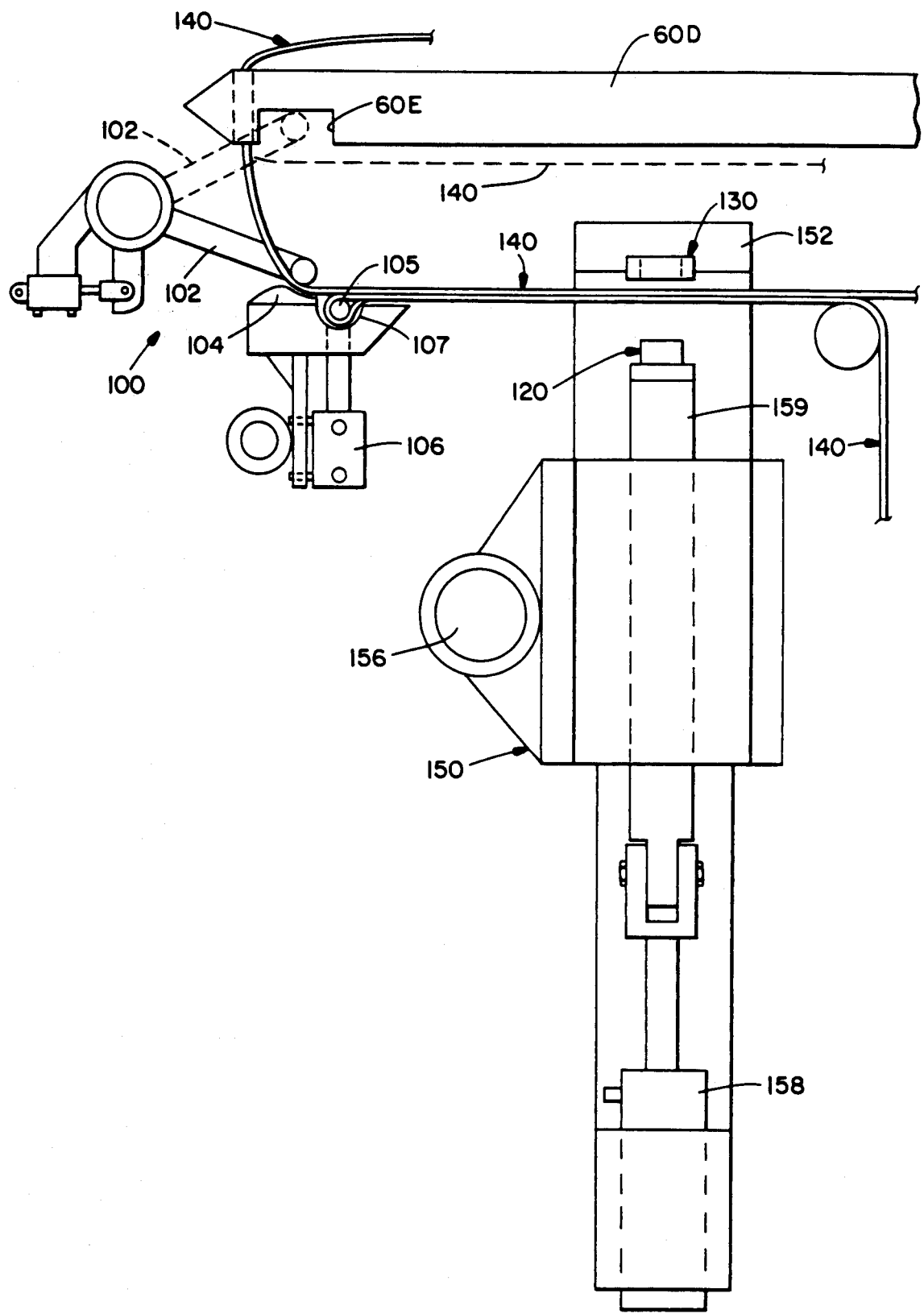
FIG. 8 is a top view illustrating one manner in which the flexible binding material is secured after being urged through the bulk material by one of the needles.

The fastener or clamping members 120 and 130 may be used to secure and bind flexible strapping material around baled units of bulk material in the baling apparatus of this invention, if desired. Apparatus 150 for use of such fastener or clamping members is illustrated in FIGS. 12A and 12B. A top view of the apparatus is shown in FIG. 8.

FIG. 12A shows the apparatus 150 in rest position, and FIG. 12B shows the apparatus in clamping position. The strip of fastener portions 130 is fed downwardly in strip form on upright support member 152. The fastener portion 120 is fed to the end of slide plunger 159 from the side in strip form through a feed tube 151.

From the position shown in FIG. 12A, cylinder 157 is first restricted to lower the apparatus to the clamping position shown in FIG. 12B. The two ends of the strapping material 140 are positioned between the fastener portions 120 and 130. When cylinder 158 is extended it urges the plunger 159 toward fastener portion 130. As the plunger 159 continues to be urged to the left, fastener portion 120 engages strapping members 140 and then continues through the opening 131 in fastener portion 130 to form a very secure clamp around the strapping members 140. Simultaneously, knife 154 severs the lower fastener portion 130 from the strip and knife 153A on support 153 severs fastener portion 120 from the strip of such fasteners and knife 153B severs one of the strapping members 140. The completed product is shown adjacent knife 153B in FIG. 12A.

Then the cylinder 158 is retracted so as to cause plunger 159 to also be retracted. This enables another fastener portion 120 to be fed to the end of plunger 159. Cylinder 157 is then caused to be extended so as to raise support member 156. When support member 156 is in its upper position, lever or dog 161 is raised and it engages the opening 131 in the next higher fastener portion 130 in the strip. The lever or dog 161 is biased toward the strip of fasteners by a spring which allows the lever to move away from the strip as it is raised but which forces the end of the lever into the next opening 131. When the cylinder 157 is retracted, the lever 161 causes the strip of fastener portions 130 to be moved downwardly to the position shown in FIG. 12B.

FIG. 8 is a top view illustrating the binding apparatus of FIGS. 12A and 12B. Also shown is a clamping system 100 for temporarily holding the strapping members 140 during the binding process. Clamping finger 102 is adapted to engage one portion of the strapping member 140 at the other end of needle section 60D (which may include notch 60E, if desired). Then finger 102 rotates toward surface 104 in order to hold the strapping member in place during the binding operation. Finger 105 (operated by cylinder 106) is adapted to hold the free end of the strapping member which encircles the bulk material to be bound.

Then the fastener portions 120 and 130 are urged towards each other into clamping arrangement on the overlapping portions of strapping member 140 as previously explained. After this has occurred, finger 105 is moved away from clamping surface 107 in order to engage the new free end of the strapping member 140 and return it to surface 107 to hold it there during the formation of the next baled unit.

Similar apparatus is used for each strapping member to be secured around a baled unit.

Other variants are possible without departing from the scope of the present invention. For example, the baling apparatus may be towed by a farm tractor which supplies the power to operate the auger and also supplies the source of hydraulic power for the various hydraulic cylinders. Alternatively, an engine could be included on the frame to supply part or all of the power requirements for the baling apparatus.

The size of the baled unit may vary as desired. It may be a small unit of several inches on each side or it may be several feet on each side.

The speed of rotation of the auger may also vary, as desired. For example, it may operate as slow as one rpm. or as fast as 1000 rpm. Also, there may be more than one auger present in the tubular housing, if desired.

What is claimed is:

1. Apparatus for forming fibrous bulk material or the like into a baled unit and binding it, said apparatus including a wheeled frame and comprising:
   (a) rotatable auger means having first and second ends;
   (b) a tubular housing surrounding said auger means; wherein said housing has first and second ends; wherein said second end is open;
   (c) feed means adjacent said housing for feeding said bulk material to said auger means;
   (d) die means having first and second ends, wherein said first end communicates with said second end of said housing;
   (e) a packing chamber communicating with said second end of said die means; wherein said chamber includes a top, a floor, and opposing side wall members; wherein said side wall members are adjustably movable inwardly and outwardly to adjust the packing tension on said bulk material in said chamber; and further comprising control means for moving said side wall members inwardly and outwardly in response to a predetermined tension value;
   (f) binding means adjacent said packing chamber; wherein said auger means urges said bulk material through said housing and said die means and into said packing chamber; wherein said die means shapes said bulk material; wherein said binding means encircles said shaped bulk material with a flexible binding member and then secures said binding member so as to form said baled unit without cessation of rotation of said auger means; wherein said auger means is able to move axially with respect to said tubular housing, wherein said side wall members are connected to a hydraulic cylinder for movement inwardly and outwardly, wherein said control means comprises a switch operably connected to said hydraulic cylinder, and wherein said auger means activates said switch when said auger means moves axially.

2. Apparatus in accordance with claim 1, wherein said auger means comprises a horizontal shaft having helical flighting secured thereto, wherein said shaft includes a first end which is rotatably driven and a second end which extends rearwardly past said second end of said housing and through said die means; and wherein said tubular housing is horizontally disposed.

3. Apparatus in accordance with claim 2, further comprising drive means, wherein said first end of said shaft extends through said first end of said housing and is connected to said drive means.

4. Apparatus in accordance with claim 1, wherein said wheeled frame includes a tongue member to enable said apparatus to be towed by a tractor, and wherein said auger means is powered by said tractor.

5. Apparatus in accordance with claim 1, further comprising an internal combustion engine carried by said frame for powering said auger means.

6. Apparatus in accordance with claim 1, wherein said second end of said die means has a square cross-section.

7. Apparatus in accordance with claim 6, wherein said first end of said die means has a square cross-section, and wherein said second end of said die means is smaller than said first end thereof.

8. Apparatus in accordance with claim 1, wherein said binding means includes (a) a plurality of elongated needles for passing through said shaped bulk material rearwardly of said die means to carry said binding member from one said side wall of said packing chamber to the opposing said side wall; and (b) securement means for securing said binding member around said shaped bulk material.

9. Apparatus in accordance with claim 8, wherein said binding means is movably carried by said packing chamber in a manner such that said binding means moves rearwardly as said binding member is secured around said shaped bulk material and without ceasing rotation of said suger means.

10. Apparatus in accordance with claim 8, wherein said needles comprise a plurality of telescoping sections.

11. Apparatus for forming fibrous bulk material or the like into a baled unit and binding it, said apparatus including a wheeled frame and comprising:
   (a) rotatable auger means having first and second ends;
   (b) a tubular housing surrounding said auger means; wherein said housing has first and second ends; wherein said second end is open;
   (c) feed means adjacent said housing for feeding said bulk material to said auger means;
   (d) die means having first and second ends, wherein said first end communicates with said second end of said housing;
   (e) a packing chamber communicating with said second end of said die means; said chamber including opposing side wall members;
   (f) binding means adjacent said packing chamber; said binding means including at least one flexible binding member;
   wherein said auger means urges said bulk material through said housing and said die means and into said packing chamber; wherein said die means shapes said bulk material; wherein said binding means includes (1) a plurality of elongated needles having a plurality of telescoping sections for passing through said shaped bulk material rearwardly of said die means to carry said binding member from one said side wall of said chamber to the opposing said side wall, and (2) securement means for securing said binding member around said shaped bulk material without cessation of rotation of said auger means.

12. Apparatus in accordance with claim 11, wherein said needles are hydraulicly operated.

13. Apparatus in accordance with claim 11, wherein said needles are pneumatically operated.

14. Apparatus in accordance with claim 11, further comprising carriage means for carrying said needles.

15. Apparatus for forming bulk material into a baled unit and binding it, said apparatus comprising:
   (a) rotatable auger means; wherein said auger means comprises a shaft having helical flighting secured thereto, wherein said shaft includes a first end and a second end;
   (b) a housing surrounding said auger means; wherein said housing has first and second ends; wherein said second end is open;
   (c) feed means for feeding said bulk material to said auger means in said housing;
   (d) die means having first and second ends, wherein said first end communicates with said second end of said housing;
   (e) tensioning means for controlling the packing density of said material; wherein said tensioning means comprises a packing chamber having a floor, a top, and opposing side members; wherein said side members are adjustably movable inwardly and outwardly to adjust the packing tension on said bulk material in said chamber; and further comprising control means for moving said side members inwardly and outwardly in response to a predetermined tension value;

(f) binding means adjacent said packing chamber; wherein said auger means urges said bulk material through said housing and said die means and into said packing chamber; wherein said die means shapes said bulk material; wherein said second end of said shaft extends past said second end of said housing and through said die means; wherein said binding means encircles said shaped bulk material with a flexible binding member and then secures said binding member so as to form said baled unit without cessation of rotation of said auger means; wherein said auger means is able to move axially with respect to said tubular housing, wherein said side wall members are connected to a hydraulic cylinder for movement inwardly and outwardly, wherein said control means comprises a switch operably connected to said hydraulic cylinder, and wherein said auger means activates said switch when said auger means moves axially.

16. Apparatus in accordance with claim 15, further comprising a wheeled frame supporting said apparatus; wherein said feed means comprises a pickup unit for lifting said bulk material from the ground as said wheeled frame is moved along the ground, said pickup unit feeding said bulk material to said first end of said auger means.

17. Apparatus in accordance with claim 16, wherein said housing has a circular cross-section, and wherein said second end of said die means has a square cross-section.

18. Apparatus in accordance with claim 15, wherein said binding means includes a plurality of elongated needles for passing through said material rearwardly of said die means to carry said binding member from one side member to the opposing side member; wherein said needles move away from said die means as said binding member is secured; and wherein said needles comprise a plurality of telescoping sections.

* * * * *